Patented Sept. 11, 1934

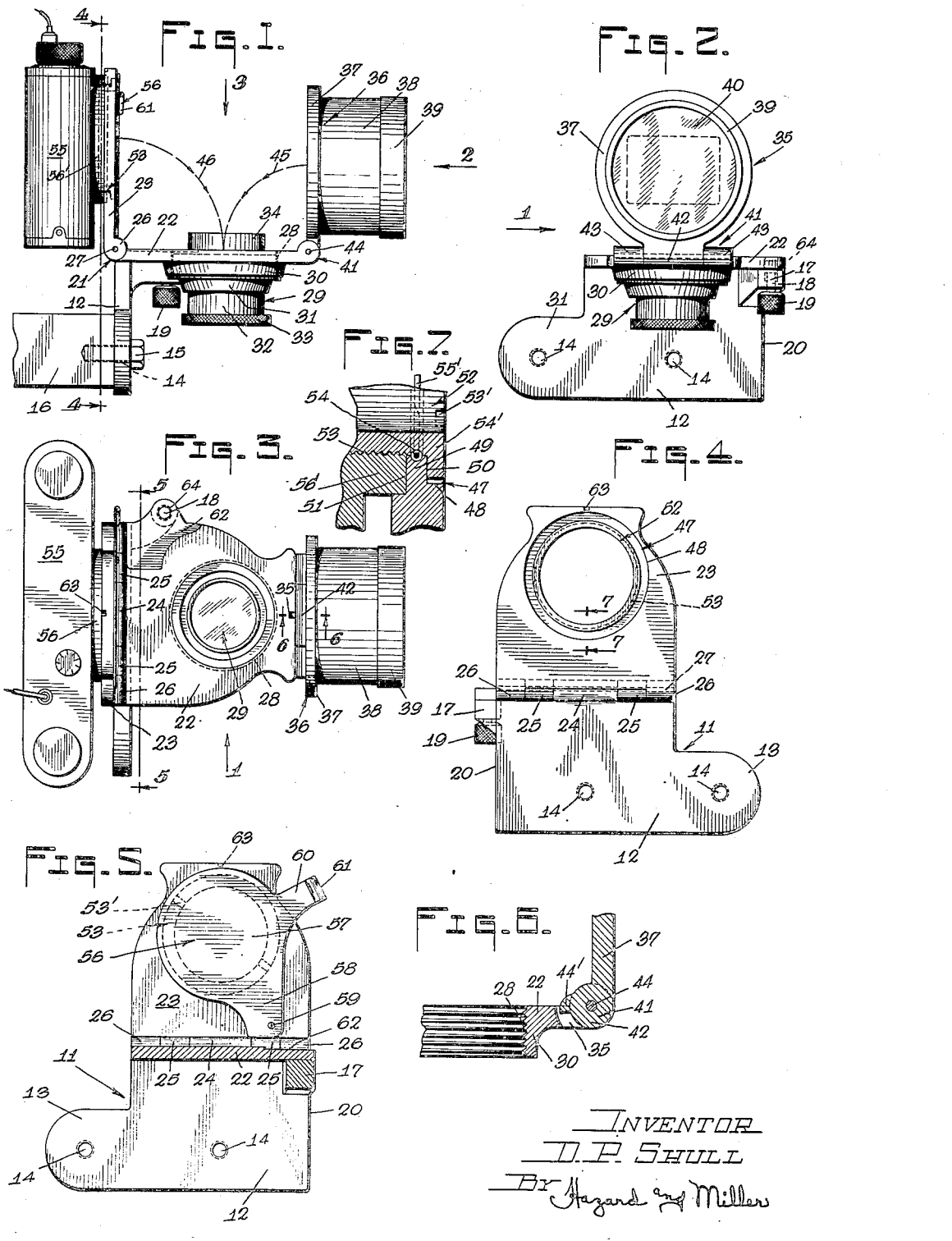

1,973,542

UNITED STATES PATENT OFFICE 1,973,542

PHOTOGRAPHIC COPYING ATTACHMENT

David Paul Shull, Los Angeles, Calif.

Application December 19, 1933, Serial No. 703,079

21 Claims. (Cl. 95—44)

My invention relates to a device for supporting camera lenses in such manner that the body of the camera having the film or plate may be moved away from the lenses and a focusing attachment may be adjusted in relation to the lenses in order that clear focusing may be obtained.

My invention is designed particularly for use with a camera having a film and no means for focusing by ground glass on the focal plane of the film, but I employ a separate device for focusing. My invention is principally designed for copying drawings, pages of books, etc. either on a reduced or on an enlarged scale, and in which the copying may be done with the material to be copied either in a horizontal or vertical plane, or at intermediate angles. My attachment when used with the camera in a vertical plane is adaptable for portraiture or copying of pictures, or the like.

An object and feature of my invention is the employment of a lens holder or a holding plate to which the camera lens after removal from the camera may be attached, and if desired, on this plate, one or more focusing tubes can be used in order to increase the focal length of enlargement as in magnifying the material being copied. To obtain a better focus I employ a focus holder hinged to one end of the lens plate.
This preferably has ground glass or the equivalent on which a clear image may be obtained. The ground glass holder may then be swung on its pivot to one side and a camera holding plate which is also pivoted to the lens plate may be turned into a position parallel with the lens plate so that the camera which is secured to the camera plate is in proper position for taking a photograph. The film, that is, the focal plane of the camera will be in exactly the same plane as that of the ground glass when focusing.

As most of the cameras used in this type of copying have a focal plane shutter, I employ a shutter plate preferably pivoted to the camera supporting plate forming a closure for the open side of the camera after removal of the lenses. This eliminates danger of light entering the opening, affecting the film behind the focal plane shutter. The shutter plate may be moved to one side on its pivot when the camera supporting plate is rotated on its hinge to a position parallel to the lens supporting plate.

Another detailed feature of my invention relates to the lens supporting plate permitting the inner portion of the lens assembly, that is a lens tube, to be moved above the plate. This, there- fore, after focusing, does not need to be moved in order to position the camera in the correct position for making a correct copy. As the ground glass is mounted at the end of a tube, this tube being pivoted over the lens supporting plate, it does not interfere with the projecting lens tube.

Another feature of my invention is pivoting both the lens plate and the camera plate on a common pivot and pivoting or hinging this to a supporting or holding bracket. This construction allows the camera to be used in a horizontal plane or a vertical plane, as desired.

Another detailed feature of my invention is a locking means for securing the lens plate and camera plate in vertically aligned positions. This employs a locking knub which is preferably secured to a hinged part of the focusing tube. This knub, on a hinged or swinging movement of the focusing tube, locks or latches the camera plate with the camera and the lens plate with the lenses in vertically aligned positions, and at the same time, retains the focusing tube out of the optical path of the camera.

One of the reasons for tilting the lens supporting plate from a horizontal position to a vertical position when copying objects on a horizontal plane, is to observe the setting of the iris diaphragm of the lenses. This cannot be readily done with the lenses pointing downwardly but may be readily accomplished when the lenses have their axes horizontally.

My invention is illustrated in connection with the accompanying drawing in which:—

Fig. 1 is a side elevation taken in the direction of the arrow 1 of Figs. 2 and 3.

Fig. 2 is a front elevation taken in the direction of the arrow 2 on Fig. 1.

Fig. 3 is a plan taken in the direction of the arrow 3 of Fig. 1.

Fig. 4 is a vertical section on the line 4—4 of Fig. 1 with the camera removed, this being in reality, a rear elevation.

Fig. 5 is a vertical section on the line 55 of Fig. 3 in the direction of the arrows.

Fig. 6 is a detailed section on the line 6—6 of Fig. 3 in the direction of the arrows showing the latching knub on the hinge of the focusing holder.

Fig. 7 may be considered as a detail section on the line 7—7 of Fig. 4 in the direction of the arrows with the camera attached.

My invention employs a main bracket 11. This is illustrated as having a vertical plate 12, which plate has a lateral extension 13. The plate and the extension have perforations 14 through which attaching screws or bolts 15 may secure the bracket to any suitable supporting structure as designated at 16. When the plate 12 is in the vertical position, a horizontal arm 17 extends from one end of the plate at its upper portion. This arm is illustrated as being tapered and the upper surface of the arm is on the level with the upper edge of the plate. In the end portion of this arm there is a vertical clamping screw 18 having a knurled head 19 for gripping with the fingers. The arm 17 inclines outwardly beyond the rear vertical edge 20 of the plate 12 as illustrated in Figs. 2 and 4.

A double hinge 21 is used to connect a lens mounting plate 22 and a camera mounting plate 23 to the bracket 11. This employs a central knuckle 24 formed integral with the upper portion of the plate 12. At each end of this knuckle there is a pair of knuckles 25 formed integral with the lens supporting plate 22, and on the outside edge, there is a second pair of knckles 26 formed integral with the camera supporting plate 23. A pintle or hinged pin 27 extends through these knuckles. Thus the knuckles and the pintle form the double hinge.

Describing first the lens supporting plate, this has a central threaded opening 28, the threads of this opening being of the same diameter and the same pitch as that of the opening in the side of the camera to which the lens assembly designated by the numeral 29 is attached to the camera. The lens plate preferably has a downwardly extending flange 30 to allow construction of a longer thread. The lens assembly has a ring 31 which is threaded internally in the threads 28 and also employs a focusing tube 32 which may be thrust upwardly or downwardly through the ring 31. This tube has a knurled band 33 for engagement by the fingers, and if desired, the upper end 34 of the lens tube 32 may extend above the lens supporting or mounting plate 22.

The lens supporting plate adjacent the center of the knuckle 42 has a vertical slot 35 for a purpose hereinunder detailed. A finder holder 36 employs a ring 37 with a tube 38 formed integral therewith, and a collar 39 on the end of the tube in which there is a ground glass or other focusing means 40. The finder holder is secured to the lens holding plate 22 by means of a hinge 41. This hinge employs a central knuckle 42 on the ring 37, and two lateral knuckles 43 on the lens supporting plate 22, a pintle 44 extending through these knuckles. The central knuckle 42 is provided with a projecting latching knub 44', the latching function of which is detailed hereinunder in connection with the description of the camera supportng plate 23, but when the finder holder with the ground glass is swung from the vertical position of Fig. 1 in the direction of the arrow 45 to occupy a horizontal position on the lens supporting plate, the knub 44 operates through the slot 35.

The camera supporting plate 23 as above described is secured by the double hinge to the bracket 11 and thus may be swung in an arc indicated by the arrow 46 in relation to the bracket and the lens supporting plate to swing the camera from a vertical to a horizontal position. The lens supporting plate has a circular opening designated by the numeral 47. This opening has a cylindrical section 48 at its inner side (note Fig. 7), and an inwardly projecting rim 49 with parallel side faces 50 and 51. The camera supporting ring 52 has an externally threaded section 53 which is of the same diameter and the same pitch of threads as those of the lens assembly, that is, of the ring 31 of the lenses. Complementary grooves 54 are formed in the ring 53 and in the rim 49 and in these complementary grooves, there is a coiled spring 55'. This spring holds the ring in assembled relation with the camera supporting plate 23, but allows rotation of the ring 52 by engaging a specially designed wrench in the wrench sockets 53'. The ring 52 has a flange 54' which abuts against the face 50 of the rim 49. The camera 55 is provided with a circular threaded ring 56' in one side, and the ring 52 is threaded into the ring 56' of the camera. The ring 56' abuts against the annular surface 51 on the inwardly extending rim 49. The camera is therefore securely attached to the camera supporting plate 23.

While the camera for which this type of device is designed has the usual focusing devices, this type of camera does not have any provision for using a ground glass or equivalent in the focal plane of the film. Although the camera is provided with a focal plane shutter, however, when the lenses and the iris diaphragm is removed, there is a certain amount of danger of light passing through the opening formed by the camera ring 56', and in passing behind the focal plane shutter it may partly expose the film. Therefore, I employ a shutter designated by the assembly numeral 56. This shutter employs a plate 57 in which a downward projection 58 is secured by a pivot pin 59 to the camera supporting plate 22. An upward projection 60 has a finger grip 61 for manipulating the shutter or closure 56 on its pivot 59. As this shutter plate 56 has appreciable thickness, in order to bring the camera plate and the lens plate 22 into close engagement in a horizontal or vertical plane, the lens plate 22 has a hollow recess 62 formed in one portion thereof, preferably above the arm 17. This is sufficient to accommodate the lateral projection 58 and the pintle 59 when the camera plate with the camera is swung downwardly in the horizontal position and the shutter 56 is swung laterally to expose the full opening of the camera which is aligned with the camera lens assembly.

For latching the lens plate and the camera plate both in the vertical position, a latching recess 63 is formed in the upper outer edge of the lens plate 23.

The lens plate 22 has a threaded socket 64 to be engaged by the screw 17 and thus retain the lens plate in a horizontal position and the plate 12 is vertical for copying objects on a horizontal plane.

The manner and operation of functioning of my device is as follows:—

If it is desired to copy material on a horizontal plane, the bracket 11 is set up as shown in Fig. 7. The lens is removed from the camera and attached to the lens member 22. If desired, focusing tubes may be attached to the plate 22 and the lens to the end of these tubes. The plate 22 can be swung on its hinge 21 so that the iris diaphragm may be adjusted. When the plate is then swung to its horizontal position it is held firm by the screw 17. The finder holder having the ground glass 40 is then turned on its hinge in the direction of the arrow 45 and the lens is manipulated until a sharp focus is obtained. In securing this focus, it may be necessary to have the upper end of the lens tube 32 project about the plate 22. When the object is satisfactorily focused, after the camera has been secured to the camera plate 23, the camera is rotated in the direction of the arrow 46. The opening in the camera has previously been covered by the shutter 56. As the plate 23 approaches the plate 22, they are held apart by the shutter 56 and it is necessary to swing this on its pivot 59 until the bracket 58 fits in the recess 62, then the plates 22 and 23 are in close contact. The ground glass for focusing of the film of the camera will be the same distance from the camera lens, that is, they will be in the same focusing plane. The tube 38 is made the desired length for the particular camera used, or if desired, the tube may be made telescoped. A photograph or series of photographs may then be taken of objects in the horizontal plane, and as long as these objects are the same distance from the camera lens there will be a sharp focus on the film provided a sharp focus was obtained on the ground glass.

The device may be used with the axes of the lenses horizontal. In this case, it is desirable to position the plate 12 horizontally and the arm 17, vertically. The lens plate and the arm 17 are secured by the screw 18. The camera plate may be tilted away and downwardly on the lens plate 22, and the ground glass holder positioned behind the lenses for obtaining a sharp focus by manipulating the lenses. When the desired focus is obtained, the finder holder 36 is swung upwardly on its hinge and the camera plate 23 is brought into contact with the lens plate 22. The holder 36 is then tilted on its hinge until the knub 44 engages in the latching recess 63 at the top of the camera plate. This retains the lens and camera plates in close contact and holds the finder 36 out of the optical path of the camera.

Various changes may be made in the details of construction without departing from the spirit or scope of the invention as defined by the appended claims.

I claim:

1. In a device as described, the combination of a lens holder, a lens mounted therein having a slidable tube, the upper end of which may be positioned projecting above the lensholder, a camera holder, a camera mounted thereon and having an opening left by removal of a lens, and a focusing means mounted on the lens holder, the focusing means and the camera each being alignable with the axis of the lens without shifting the lens tube from a position projecting above the lens holder.

2. In a device as described in claim 1, a shutter pivotally connected to the camera holder and adapted to close the said opening in the camera, the said shutter being movable out of the optical path of the camera when the camera is aligned with the lens.

3. In a device as described, a lens holding plate, a tubular finding device, having a ground glass, pivotally connected to said plate and movable into and out of alignment with the axis of the lens, a camera holding plate having an opening pivoted to the lens plate, means in the said opening for attaching a camera, the holding plate being movable on its pivot to align the said opening with the axis of the lens.

4. In a device as described in claim 3, a supporting bracket, the lens holding plate and the camera holding plate being both hinged to the bracket by a common hinge whereby the lens holding plate may occupy either a horizontal or a vertical position.

5. In a device as described in claim 3, a shutter pivotally mounted on said camera holding plate adapted to form a closure for the opening, and a recess in the lens holding plate to accommodate part of the said shutter when moved out of alignment with the axis of the said opening.

6. In a device as described, a bracket, a lens holding plate mounted on said bracket and having an opening to receive a lens, a focusing device including a tube, and a ground glass hinged to one side of the said plate, a camera holding plate having an opening hinged to the other side of the lens holding plate, the opening in the camera holding plate having means for attaching the camera, the said tube being movable in an arc to align the ground glass with the axis of the lens, and on removal out of such alignment, the camera holding plate being movable to align the film of the camera with the axis of the lens.

7. In a device as described in claim 6, the lens holding plate being hinged to the bracket and movable into a vertical plane parallel to the vertical plane of the camera holding plate, and a latching device operative between the tube having the ground glass and the camera holding plate to retain the lens plate and the camera plate in parallel vertical positions.

8. In a device as claimed in claim 6, the means to attach the camera to the camera plate comprising a ring rotatably mounted in the opening in the camera plate and having threads to engage complementary threads on a ring of the camera.

9. In a device as described, a bracket having a vertical plate and a horizontal arm, a lens holding plate having a threaded opening hinged to the bracket, means to connect the arm and the lens plate, a camera holding plate having an opening hinged to the same hinge as the lens plate and movable in an arc between the vertical and the horizontal positions, the camera plate having an attaching means in the said opening of the camera plate for attaching a camera, a focusing device having a ring hinged to the side of the lens plate opposite the hinge of the camera plate, a tube connected to said ring, a ground glass mounted in said tube, the tube and ground glass being alignable with the axis of the lens.

10. In a device as described in claim 9, a knub connected to the ring of the focusing device, there being a slot in the lens plate to accommodate said knub when the said ring is rotated to a horizontal position parallel to the lens plate, the camera plate having a latching recess at the top to engage the knub when the lens plate is rotated to a vertical position parallel to the camera plate.

11. In a device as described, a bracket having a horizontal arm, a lens holding plate and a camera holding plate hinged to said bracket, a screw in the arm engaging the lens holding plate, the said lens holding plate having an opening threaded internally to receive this assembly, the camera holding plate having an opening with a loose ring mounted therein, said ring being externally threaded to engage a threaded opening in a camera, a focusing device including a ring hinged to the side of the lens plate opposite the first mentioned hinge, a tube connected to the said ring and a ground glass in the tube.

12. In a device as claimed in claim 11, a shutter pivotally mounted on the camera plate and adapted in one position to close the opening in said plate, the lens plate having a shallow recess to accommodate the said shutter when moved out of axial alignment of the camera and the lens assembly, the lens assembly plate having a slot, the said ring having a knub operating through the said slot, the camera plate having a latching recess to engage the said knub and retain the camera and lens plate in vertical parallel positions.

13. In a device as described, a lens holder, a camera box having an opening in one side and a photographing medium in optical alignment with the opening, means to hinge the camera box to the lens holder, a focusing means also hinged to the lens holder and rotatable on its hinge from an inoperative to an operative position, with the optical axis of the lens and focusing means aligned, said focusing means when in its inoperative position leaving a space for rotating the camera box on its hinge to align the optical axis of the lens, the opening and the photographing medium.

14. A device as described, comprising a lens holder, a focusing means having a focusing screen pivotally connected to the lens holder, whereby when the focusing means is in an operative position the lens and the focusing screen are in optical alignment, a camera holder having an opening and means for attaching a camera box thereto also pivoted to the lens holder, said camera holder when in its operative position causing said opening and the lens to be in optical alignment.

15. In a device as described, the combination of a lens holder, a lens mounted therein having a slidable tube, one end of which tube may be positioned with part of the tube projecting above the holder, a camera holder, a camera mounted thereon and having an opening, the camera being movable to bring the optical axis of the lens, the opening, and camera into alignment, the projecting end of the tube extending into said opening.

16. In a device as claimed in claim 15, a focusing means also mounted on the lens holder and movable into optical alignment with the lens in the lens holder and on the same side as the projecting tube without moving said tube.

17. In a device as described, the combination of a lens holder, a lens mounting tube slidable therein, whereby one end of said tube may be positioned above said holder, a camera holder with an opening and having means for attaching a camera with a camera opening formed by removal of the camera lens, said camera holder being movably mounted on said lens holder and in an operative position, bringing the optical axis of the lens tube and said openings into alignment without disturbing the projecting end of said tube.

18. In a device as claimed in claim 17, a focusing means with a tube and a focusing screen therein also movably mounted on the lens holder shiftable without disturbing the lens tube to an operative position, with the optical axis of the lens and focusing tubes in alignment.

19. In a device as described, the combination of a lens holder having an opening, a camera box having an opening formed by removal of the camera lens, the lens holder having means to support the removed camera lens, a connecting means between the lens holder and the camera box permitting movement of the box from an inoperative to an operative position with the camera opening and the lens holder opening in optical alignment, a focusing means having a focusing screen hinged to the lens holder and rotatable from an inoperative to an operative position with the focusing screen and holder opening in optical alignment.

20. In a device as described, a bracket having a plate with attaching means and an arm at right angles thereto, a lens mounting plate and a camera mounting plate hinged by a common pintle to the bracket at right angles to the plate and arm, said lens and camera plates each having an opening for mounting a lens and a camera box respectively, and a focusing means hinged to the lens plate at one edge, and means on the arm to secure the lens plate thereto, the focusing means or the camera plate being rotatable on their hinges to position the focusing means or the camera plate opening in optical alignment with the lens plate and opening.

21. In a device as claimed in claim 20, the camera plate having a latching recess, the lens plate having a slot, a focusing means having a latching nub moving through the said slot on rotating the focusing means on its hinge and engaging the latching recess to retain the camera plate and lens plate in vertical parallel positions.

DAVID PAUL SHULL.